(12) United States Patent
Fu et al.

(10) Patent No.: US 12,450,047 B2
(45) Date of Patent: Oct. 21, 2025

(54) AUTOMATIC CONTAINER IMAGE REGISTRY SELECTION

(71) Applicant: International Business Machines Corporation, Armonk, NY (US)

(72) Inventors: Rong Fu, Ningbo (CN); Hao Sheng, Ningbo (CN); Pan Li, Beijing (CN); Xiao Lin Sun, Beijing (CN); Yao Chen, Ningbo (CN); Qing Yuan Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 18/309,084

(22) Filed: Apr. 28, 2023

(65) Prior Publication Data

US 2024/0362006 A1 Oct. 31, 2024

(51) Int. Cl.
*G06F 8/61* (2018.01)
*G06F 11/34* (2006.01)

(52) U.S. Cl.
CPC ............ *G06F 8/63* (2013.01); *G06F 11/3419* (2013.01)

(58) Field of Classification Search
CPC .. G06F 8/63; G06F 11/3419; G06F 2201/815; G06F 2201/865; G06F 11/3006; G06F 11/301; G06F 11/302; G06F 11/3452
See application file for complete search history.

(56) References Cited

U.S. PATENT DOCUMENTS

| | | | |
|---|---|---|---|
| 10,291,706 B1 | 5/2019 | Zhao et al. | |
| 10,534,566 B1 * | 1/2020 | Bk | ........................ G06F 3/0649 |
| 10,606,881 B2 | 3/2020 | Chiba et al. | |
| 11,086,545 B1 * | 8/2021 | Dayal | ...................... G06F 3/067 |
| 11,182,193 B2 * | 11/2021 | Skourtis | .............. G06F 9/45558 |
| 11,422,846 B2 | 8/2022 | Cao et al. | |
| 2010/0036931 A1 * | 2/2010 | Certain | ............... G06F 11/1451 |
| | | | 711/E12.001 |

(Continued)

OTHER PUBLICATIONS

"Hosting docker images on multiple registries but reference them the same way e.g. in a k8s deployment," Server Fault, accessed Apr. 25, 2023, 3 pages. https://serverfault.com/questions/1043707/hosting-docker-images-on-multiple-registries-but-reference-them-the-same-way-e-g.

(Continued)

*Primary Examiner* — Benjamin C Wu
(74) *Attorney, Agent, or Firm* — Yee & Associates, P.C.

(57) ABSTRACT

Automatic container image registry selection is provided. A predefined number of top performing container image registries is selected from a top of a sorted list of a plurality of container image registries listed in descending order. A cluster of host nodes where a container is deployed is enabled to pull a same container image corresponding to the container utilizing different predefined pulling percentages from the predefined number of top performing container image registries. The cluster of host nodes utilizes a different predefined pulling percentage to pull the same container image from each respective top performing container image registry. A current real time average pulling speed of the cluster of host nodes for the same container image from each respective top performing container image registry of the predefined number of top performing container image registries is recorded over a defined time period.

20 Claims, 10 Drawing Sheets

(56) References Cited

U.S. PATENT DOCUMENTS

| | | | | |
|---|---|---|---|---|
| 2012/0117320 | A1* | 5/2012 | Pinchover | G06F 12/0866 |
| | | | | 711/170 |
| 2014/0115285 | A1* | 4/2014 | Arcese | G06F 9/45533 |
| | | | | 711/162 |
| 2016/0266932 | A1* | 9/2016 | Phelan | G06F 9/5027 |
| 2019/0347121 | A1* | 11/2019 | Luo | G06F 9/542 |
| 2020/0081644 | A1* | 3/2020 | Jeyaram | G06F 3/064 |
| 2020/0142801 | A1* | 5/2020 | Huang | G06F 11/0751 |
| 2021/0208863 | A1* | 7/2021 | Kuriata | G06F 12/0238 |
| 2022/0103623 | A1* | 3/2022 | Fong | H04L 67/1078 |
| 2023/0281100 | A1* | 9/2023 | Wells | G06F 11/3006 |
| | | | | 702/186 |
| 2023/0401050 | A1* | 12/2023 | Sree Prakash | G06F 9/45558 |
| 2024/0134878 | A1* | 4/2024 | Scrivano | G06F 9/4881 |
| 2025/0260735 | A1* | 8/2025 | Takkar | H04L 67/1065 |

OTHER PUBLICATIONS

"Multi-architecture images with image indexes," The Kubernetes Authors, Oct. 8, 2022, accessed Apr. 25, 2023, 4 pages. https://kubernetes.io/docs/concepts/containers/images/#multi-architecture-images-with-image-indexes.

Bermingham, "The Hybrid Cloud for High Availability," The New Stack, Dec. 24, 2019, accessed Apr. 25, 2023, 11 pages. https://thenewstack.io/the-hybrid-cloud-for-high-availability/.

Zhao et al., "DupHunter: Flexible High-Performance Deduplication for Docker Registries," Proceedings of the 2020 USENIX Annual Technical Conference, Jul. 15-17, 2020, 16 pages. https://www.usenix.org/conference/atc20/presentation/zhao.

* cited by examiner

AUTOMATIC CONTAINER IMAGE REGISTRY SELECTION

BACKGROUND

The disclosure relates generally to container orchestration platforms and more specifically to automatically selecting a fastest performing container image registry for a cluster of host nodes.

A container orchestration platform, architecture, or the like, such as, for example, Kubernetes® (a registered trademark of the Linux Foundation of San Francisco, CA, USA), provides an environment for automating deployment, scaling, and operations of containers across clusters of host nodes. Many cloud services offer a container orchestration platform as a service (e.g., Platform-as-a-Service, Infrastructure-as-a-Service, or the like). A host node is a machine, either physical or virtual, where containers (i.e., application workloads) are deployed. A container is the lowest level of a micro-service, which holds the running application, libraries, and their dependencies. A pod is a group of one or more containers, with shared storage and network resources, and a specification for how to run the containers. A pod's contents are always co-located and co-scheduled and run in a shared context. The host node runs the pods that are the components of the application workload.

A scheduler selects which host node an unscheduled pod runs on, based on resource availability of respective host nodes. A pod is the basic unit managed by the scheduler. The scheduler tracks resource utilization on each host node to ensure that workload is not scheduled in excess of available resources.

SUMMARY

According to one illustrative embodiment, a computer-implemented method for automatic container image registry selection is provided. A computer selects a predefined number of top performing container image registries from a top of a sorted list of a plurality of container image registries listed in descending order. The computer enables a cluster of host nodes where a container is deployed to pull a same container image corresponding to the container utilizing different predefined pulling percentages from the predefined number of top performing container image registries. The cluster of host nodes utilizes a different predefined pulling percentage to pull the same container image from each respective top performing container image registry. The computer records a current real time average pulling speed of the cluster of host nodes for the same container image from each respective top performing container image registry of the predefined number of top performing container image registries over a defined time period. According to other illustrative embodiments, a computer system and computer program product for automatic container image registry selection are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
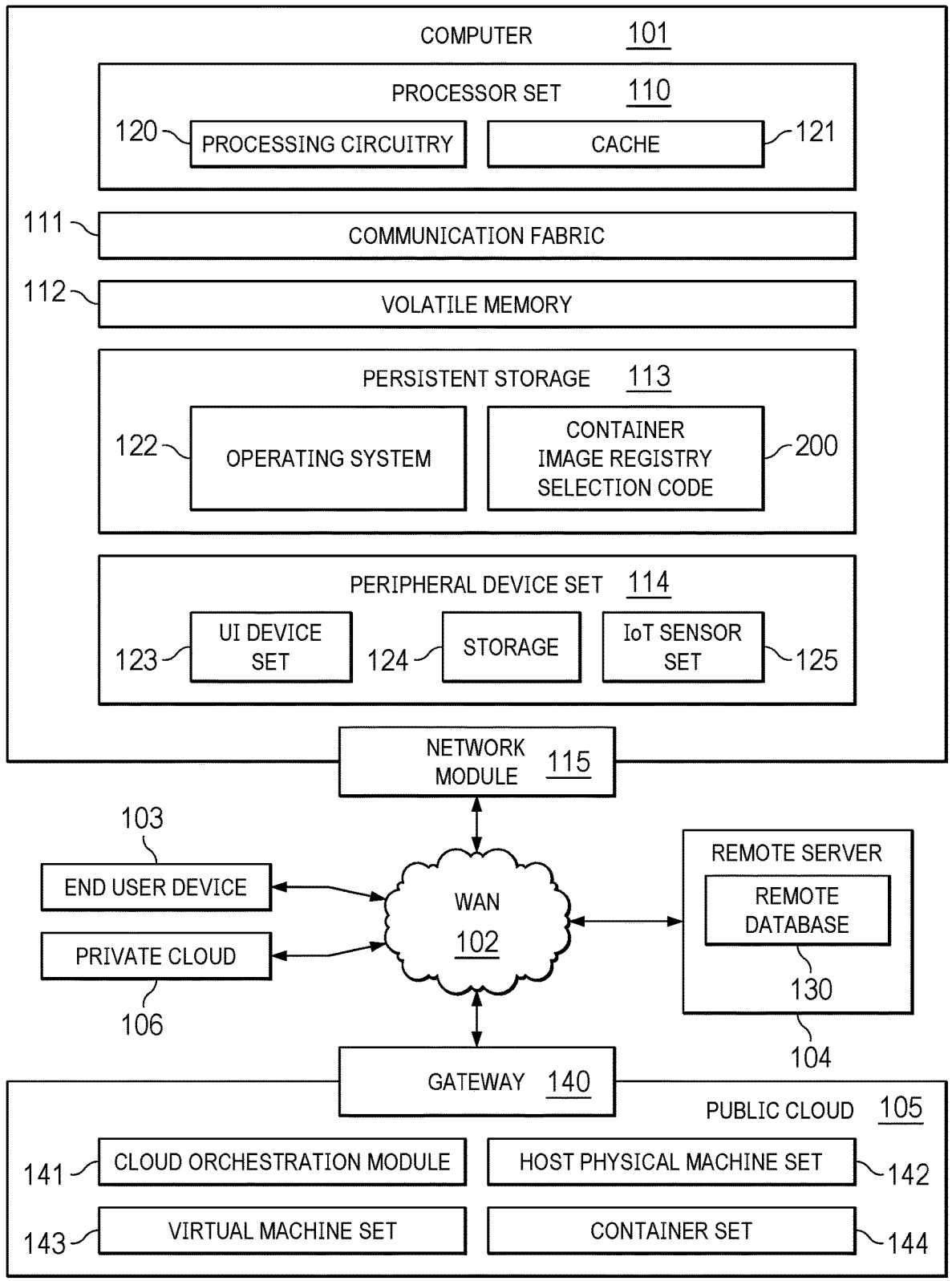
FIG. 1 is a pictorial representation of a computing environment in which illustrative embodiments may be implemented.
Figure 2:
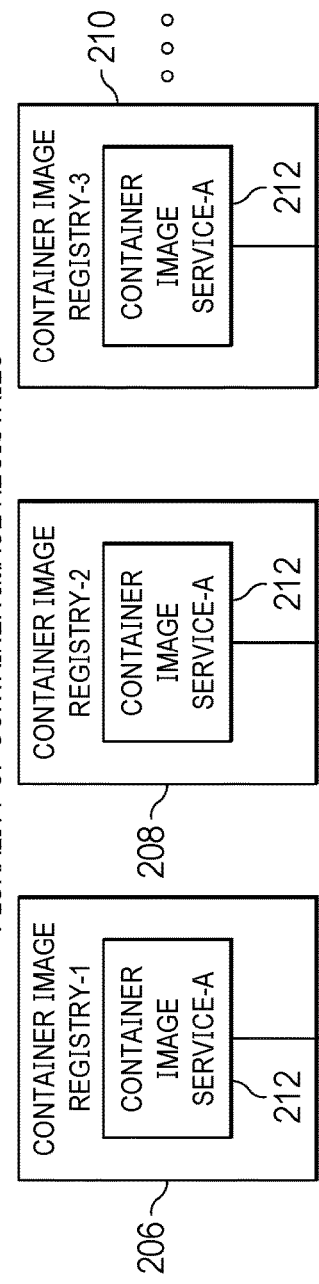
FIG. 2 is a diagram illustrating an example of a container image registry selection system in accordance with an illustrative embodiment.
Figure 2:
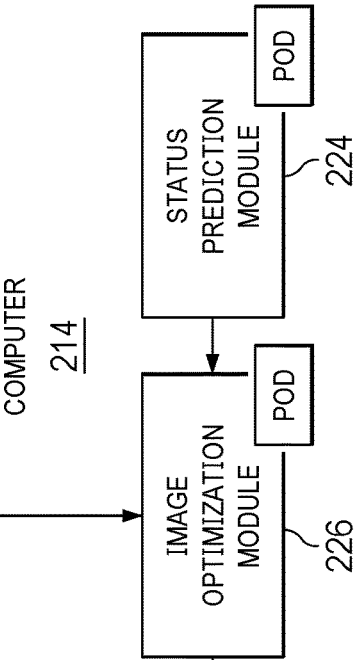

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as container image registry selection code 200. For example, container image registry selection code 200 maintains the same container image among a plurality of different container image registries and a plurality of different container deployment environments, such as, for example, different clusters of host nodes. A container image represents binary data that encapsulates an application and all its dependencies. Container image registry selection code 200 utilizes a status prediction module to monitor availability and performance between a container image registry and a container deployment environment. Container image registry selection code 200 also utilizes an image optimization module to pull the container image from the container image registry having the highest performance (e.g., fastest pulling speed). In other words, container image registry selection code 200 selects the fastest performing container image registry from a plurality of different container image registries for container image deployment on different clusters of host nodes based on historical performance data to optimize container image pulling.

In addition to container image registry selection code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container image registry selection code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods of illustrative embodiments. In computing environment 100, at least some of the instructions for performing the inventive methods may be stored in container image registry selection code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The container image registry selection code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a program developer or operations team utilizing the container image registry selection services provided by computer 101), and may take any of the forms discussed above in connection with computer 101. EUD 103 typically receives helpful and useful data from the operations of computer 101. For example, in a hypothetical case where computer 101 is designed to provide a container image registry selection to the end user, this recommendation would typically be communicated from network module 115 of computer 101 through WAN 102 to EUD 103. In this way, EUD 103 can display, or otherwise present, the container image registry selection to the end user. In some embodiments, EUD 103 may be a client device, such as thin client, heavy client, mainframe computer, desktop computer, laptop computer, tablet computer, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container image registry selection based on historical performance data, then this historical performance data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With the development of cloud-related technologies, container orchestration platforms (e.g., Kubernetes or the like) are playing an increasing role in cloud solutions. Container deployment on a container orchestration platform depends on container image registries. For example, a program developer builds a container image, pushes the container image onto a container image registry, and writes a container deployment YAML file that includes a container deployment script and address of the container image registry storing that container image. The program developer applies and enables the container deployment YAML file in the container orchestration platform. Afterward, the container orchestration platform pulls the container image according to the container deployment script, starts the container, and manages the entire lifecycle of that container in a cluster of host nodes.

A hybrid cloud environment can have a multitude of different container image registries and a multitude of host node clusters with hundreds or thousands of containers running or deploying at the same time. In some scenarios, the clusters of host nodes pull a plurality of container images from container image registries at the same time. Some of these container image registries may be unavailable to access or have low performance due to network issues because these container image registries are in different geographic regions, have different network environments, support different service level agreements, or the like. As a result, the container orchestration platform may be unable to pull container images from these container image registries or it will take a longer time to get the container images from these container image registries. For example, the container orchestration platform may be performing disaster recovery, cluster patching, horizontal pod autoscaling, or the like.

Illustrative embodiments automatically select a top or fastest performing container image registry for a cluster of host nodes to pull a container image from and then automatically switch to the selected top performing container image registries for that cluster of host nodes. Program developers or an operations team push or synchronize the same container image corresponding to a service onto a plurality of container image registries located at different geographic regions (e.g., different states, different group of states, different countries, different group of countries, different continents, or the like). Illustrative embodiments utilize a status prediction module to record historical performance data corresponding to each respective container image registry for each respective cluster of host nodes of the container orchestration platform and predict the future performance of each respective container image registry to select the highest performing container image registry for a particular cluster of host nodes where a container, which corresponds to the container image of the service, is deployed.

During the container deployment process, illustrative embodiments utilize an image optimization module to update the container image address to the selected container image registry, deploy the container to track the real time performance of each container image registry for each cluster of host nodes, and then select the container image registry that has the best performance for other container deployments.

Thus, illustrative embodiments support multiple container image registries for a single same container image corresponding to a service. As a result, illustrative embodiments enhance high availability and disaster recovery of the service deployed in a hybrid cloud environment by automatically switching to the top or fastest performing container image registry for the cluster of host nodes performing the service.

Therefore, illustrative embodiments provide one or more technical solutions that overcome a technical problem with clusters of host nodes trying to pull container images from container image registries having poor performance issues while also trying to provide requested services. Accordingly, these one or more technical solutions provide a technical effect and practical application in the field of container orchestration platforms.

With reference now to FIG. 2, a diagram illustrating an example of a container image registry selection system is depicted in accordance with an illustrative embodiment. Container image registry selection system 201 may be implemented in a computing environment, such as computing environment 100 in FIG. 1. Container image registry selection system 201 is a system of hardware and software components for automatically selecting a top or fastest performing container image registry for a particular cluster of host nodes to pull a container image corresponding to a container of a containerized service application deployed on that particular cluster of host nodes and automatically switching that particular cluster of host nodes to the selected top performing container image registry.

In this example, container image registry selection system 201 includes plurality of container image registries 202 and container orchestration platform 204. Plurality of container image registries 202 include container image registry-1 206, container image registry-2 208, and container image registry-3 210. However, it should be noted that plurality of container image registries 202 can include any number of container image registries. Also, each of container image registry-1 206, container image registry-2 208, and container image registry-3 210 can be located in a different geographic region. In addition, each of container image registry-1 206, container image registry-2 208, and container image registry-3 210 include the same container image (i.e., container image 212 for service-A).

Container orchestration platform 204 includes computer 214 and cluster of host nodes-A 216. Computer 214 may be, for example, computer 101 in FIG. 1. Cluster of host nodes-A 216 may be, for example, host physical machine set 142 in FIG. 1. However, it should be noted that container orchestration platform 204 can include any number of computers and clusters of host nodes.

In this example, cluster of host nodes-A 216 includes host node 218, but can also include a number of other host nodes. A scheduler of computer 214 deploys container 220 for service-A on pod 222 of host node 218. Container 220 for service-A corresponds to container image 212 for service-A. Service-A can represent any type of service, such as, for example, a banking service, financial service, entertainment service, healthcare service, educational service, governmental service, insurance service, streaming data service, or the like.

Computer 214 includes status prediction module 224 and image optimization module 226. Status prediction module 224 and image optimization module 226 may, for example, be implemented by container image registry selection code 200 in FIG. 1. Computer 214 utilizes status prediction module 224 to collect historical performance data corresponding to each of container image registry-1 206, container image registry-2 208, and container image registry-3 210. In addition, computer 214 utilizes status prediction module 224 to generate a sorted list of container image registries in descending order from fastest performing container image registry to slowest performing container image registry based on the collected historical performance data corresponding to each of container image registry-1 206, container image registry-2 208, and container image registry-3 210.

Status prediction module 224 outputs the sorted list of container image registries to image optimization module 226. Computer 214 utilizes image optimization module 226 to select the top or fastest performing container image registry for host node 218 to pull container image 212 for service-A from to run container 220 for service-A in pod 222.

Figure 3:
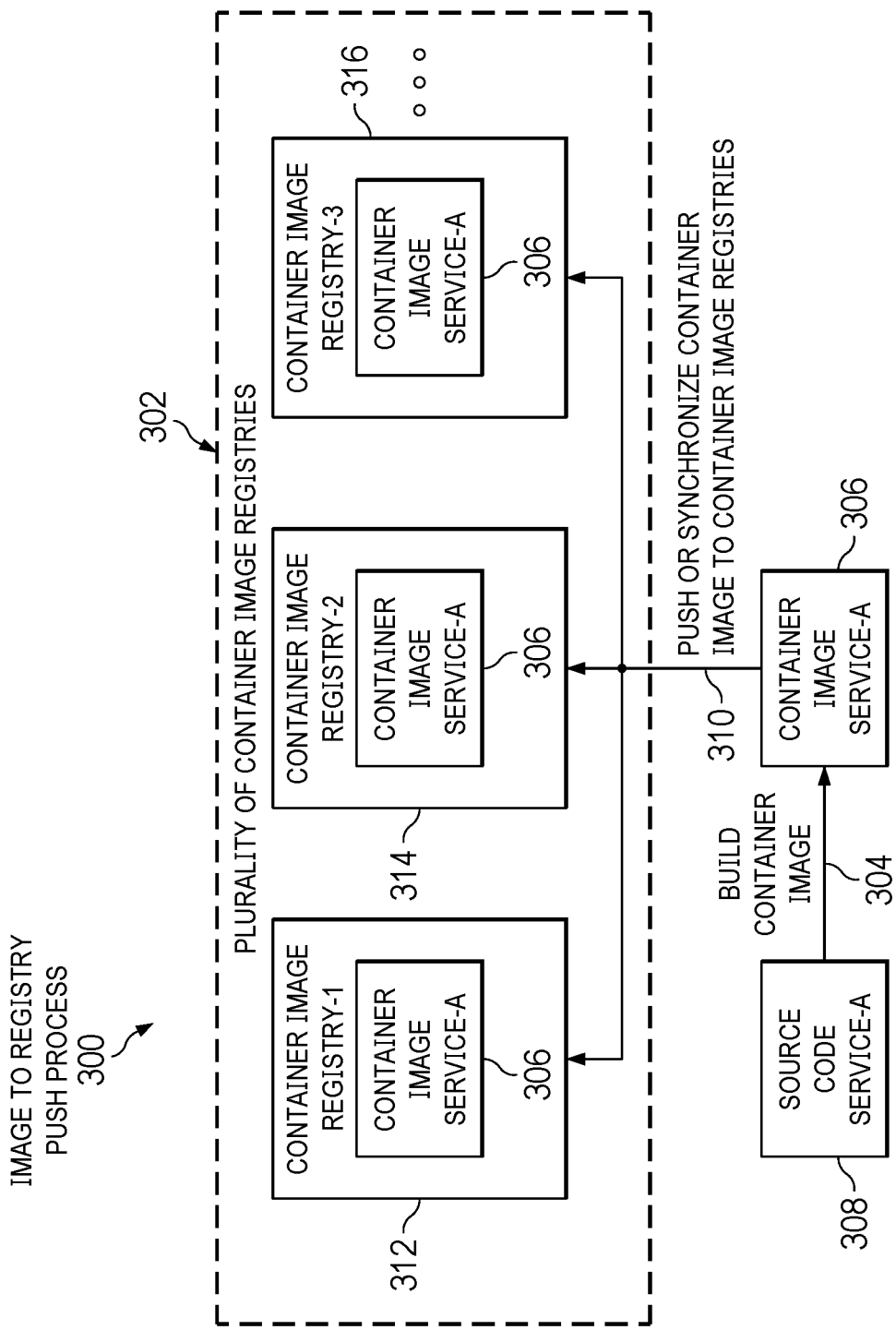
FIG. 3 is a diagram illustrating an example of an image to registry push process in accordance with an illustrative embodiment.

With reference now to FIG. 3, a diagram illustrating an example of an image to registry push process is depicted in accordance with an illustrative embodiment. Image to registry push process 300 involves plurality of container image registries 302, such as, for example, plurality of container image registries 202 in FIG. 2.

In this example, at 304, a user, such as, for example, a program developer, operations team, computer, or the like, builds container image 306 for service-A based on source code 308 for service-A. Container image 306 for service-A may be, for example, container image 212 for service-A in FIG. 2. At 310, the user pushes or synchronizes container image 306 for service-A to each of container image registry-1 312, container image registry-2 314, container image registry-3 316, and any other container image registry included in plurality of container image registries 302.

Figure 4:
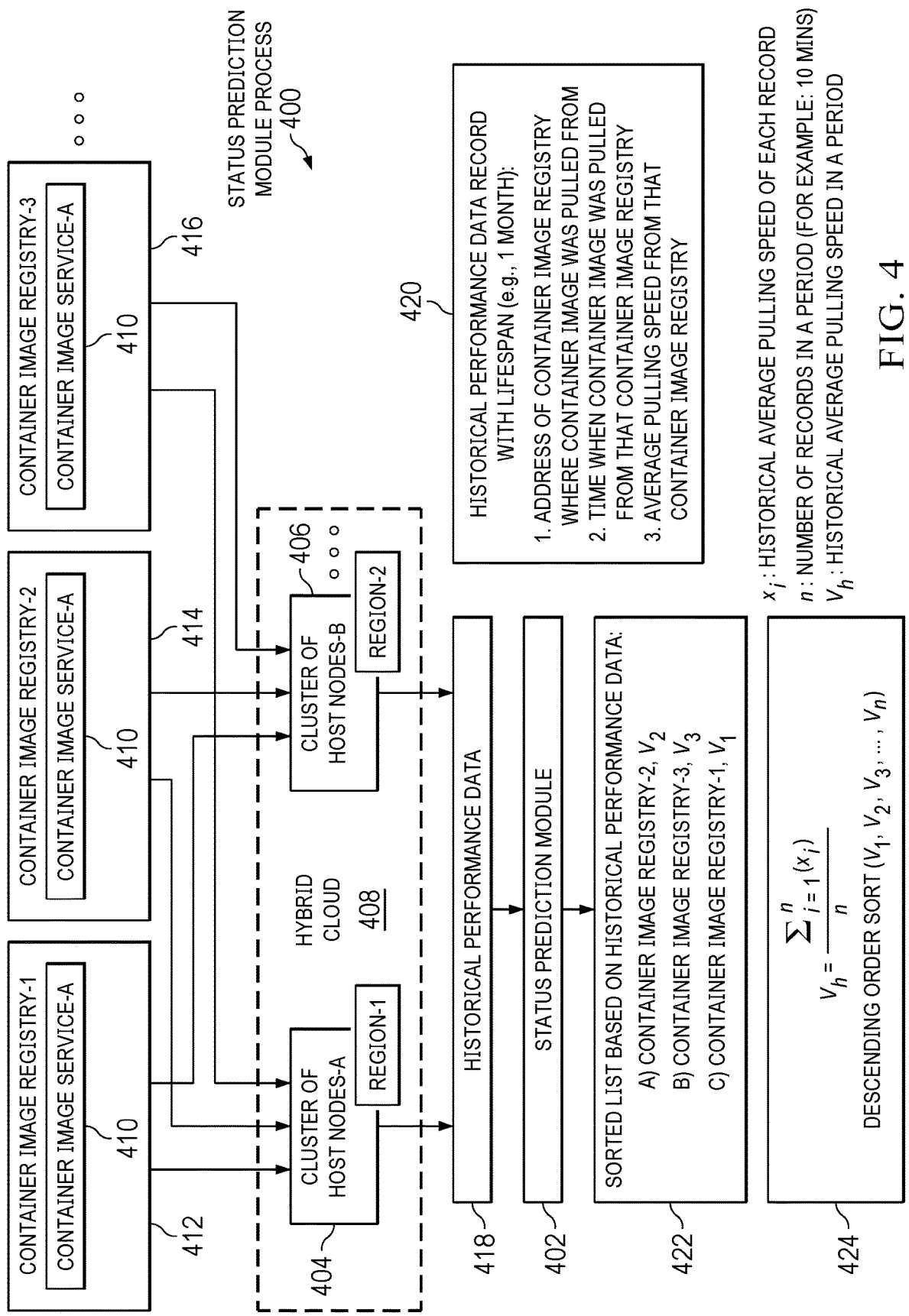
FIG. 4 is a diagram illustrating an example of a status prediction module process in accordance with an illustrative embodiment.

With reference now to FIG. 4, a diagram illustrating an example of a status prediction module process is depicted in accordance with an illustrative embodiment. Status prediction module process 400 is implemented by status prediction module 402, such as, for example, status prediction module 224 in FIG. 2.

In this example, status prediction module 402 monitors cluster of host nodes-A 404 and cluster of host nodes-B 406 in hybrid cloud 408. However, it should be noted that status prediction module 402 can monitor any number of clusters of host nodes. Also, the clusters of host nodes do not have to reside in a hybrid cloud environment.

Status prediction module 402 collects performance data regarding each of cluster of host nodes-A 404 and cluster of host nodes-B 406 pulling container image 410 for service-A from each of container image registry-1 412, container image registry-2 414, and container image registry-3 416. Container image 410 for service-A may be, for example, container image 306 for service-A in FIG. 3. Container image registry-1 412, container image registry-2 414, and container image registry-3 416 may be, for example, container image registry-1 312, container image registry-2 314, and container image registry-3 316 in FIG. 3.

Based on the collected performance data regarding each of cluster of host nodes-A 404 and cluster of host nodes-B 406 pulling container image 410 for service-A from each of container image registry-1 412, container image registry-2 414, and container image registry-3 416, status prediction module 402, status prediction module 402 generates historical performance data record 420 for each of cluster of host nodes-A 404 and cluster of host nodes-B 406. Each historical performance data record has a predefined lifespan of, for example, one month. Historical performance data record 420 of a corresponding cluster of host nodes includes information, such as, for example, address of the container image registry where the corresponding cluster of host nodes pulled container image 410 for service-A from, time when the corresponding cluster of host nodes pulled container image 410 for service-A from that particular container image registry, historical real time average pulling speed of the corresponding cluster of host nodes from that particular container image registry, and the like.

Based on the information contained in historical performance data record 420 for cluster of host nodes-A 404 and cluster of host nodes-B 406, status prediction module 402 generates sorted list 422 using equation 424. In this example, sorted list 422 ranks container image registry-2 414 first as being the fastest performing container image registry, container image registry-3 416 second as being the second fastest performing container image registry, and container image registry-1 412 third as being the slowest performing container image registry. Equation 424 is, for example:

$$V_h = \frac{\sum_{i=1}^{n}(x_i)}{n},$$

where $x_i$ is the historical real time average pulling speed of each historical performance data record 420, n is the number of historical performance data records in a time period (e.g., 10 minutes), and $V_h$ is the historical real time average pulling speed in the time period.

Figure 5A:
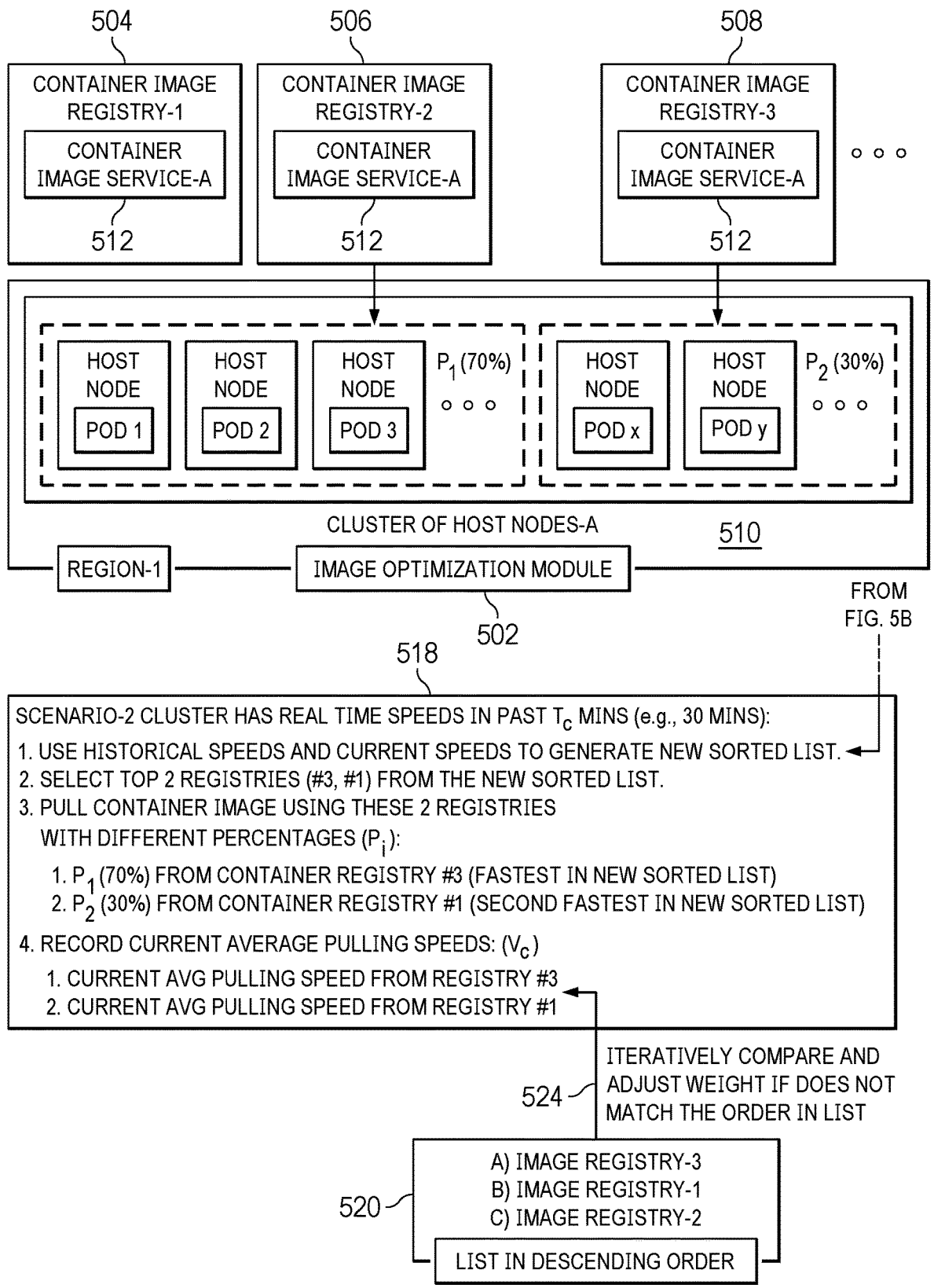
FIGS. 5A-5B are a diagram illustrating an example of an image optimization module process in accordance with an illustrative embodiment.
Figure 5B:
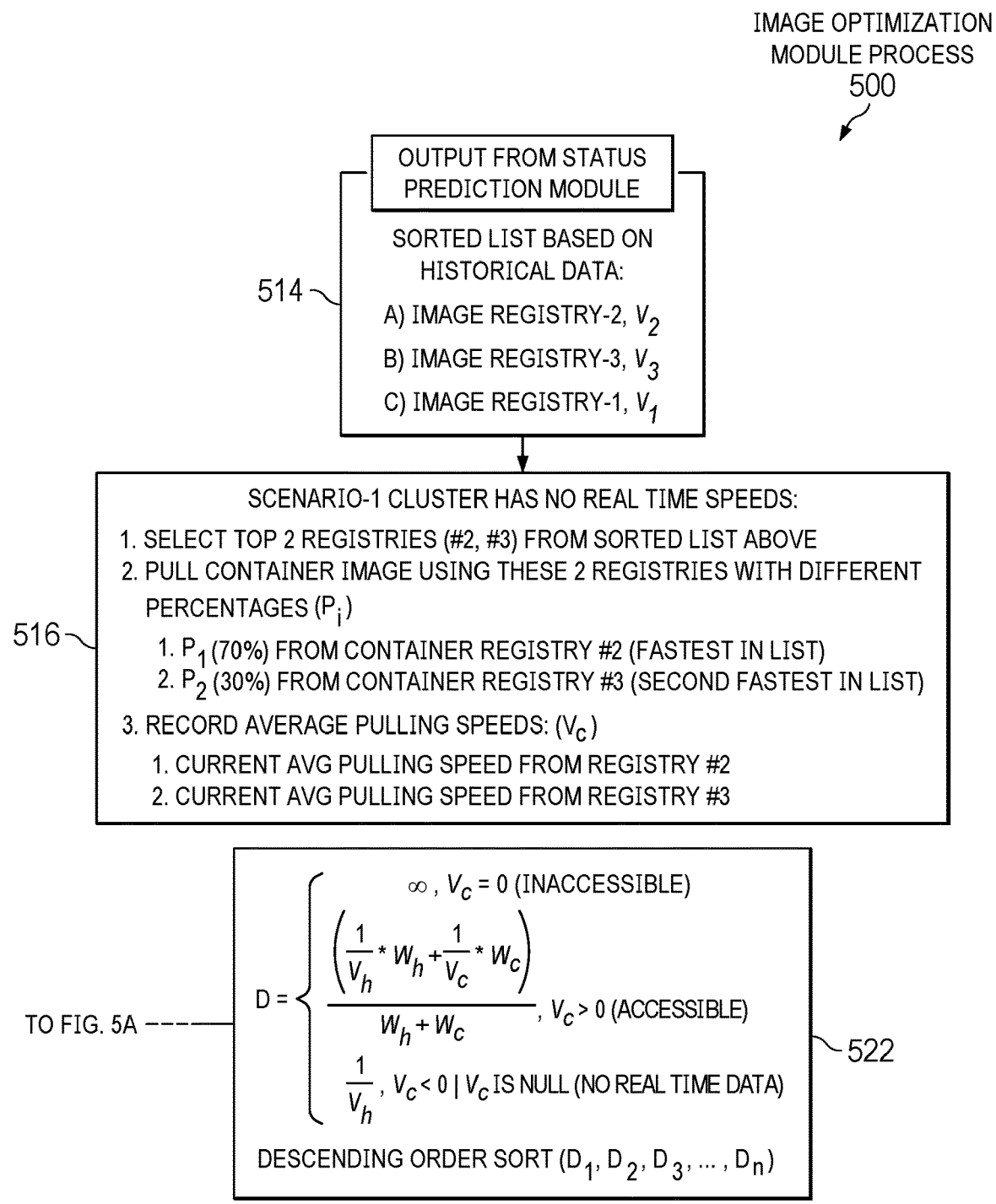
Figure 6A:
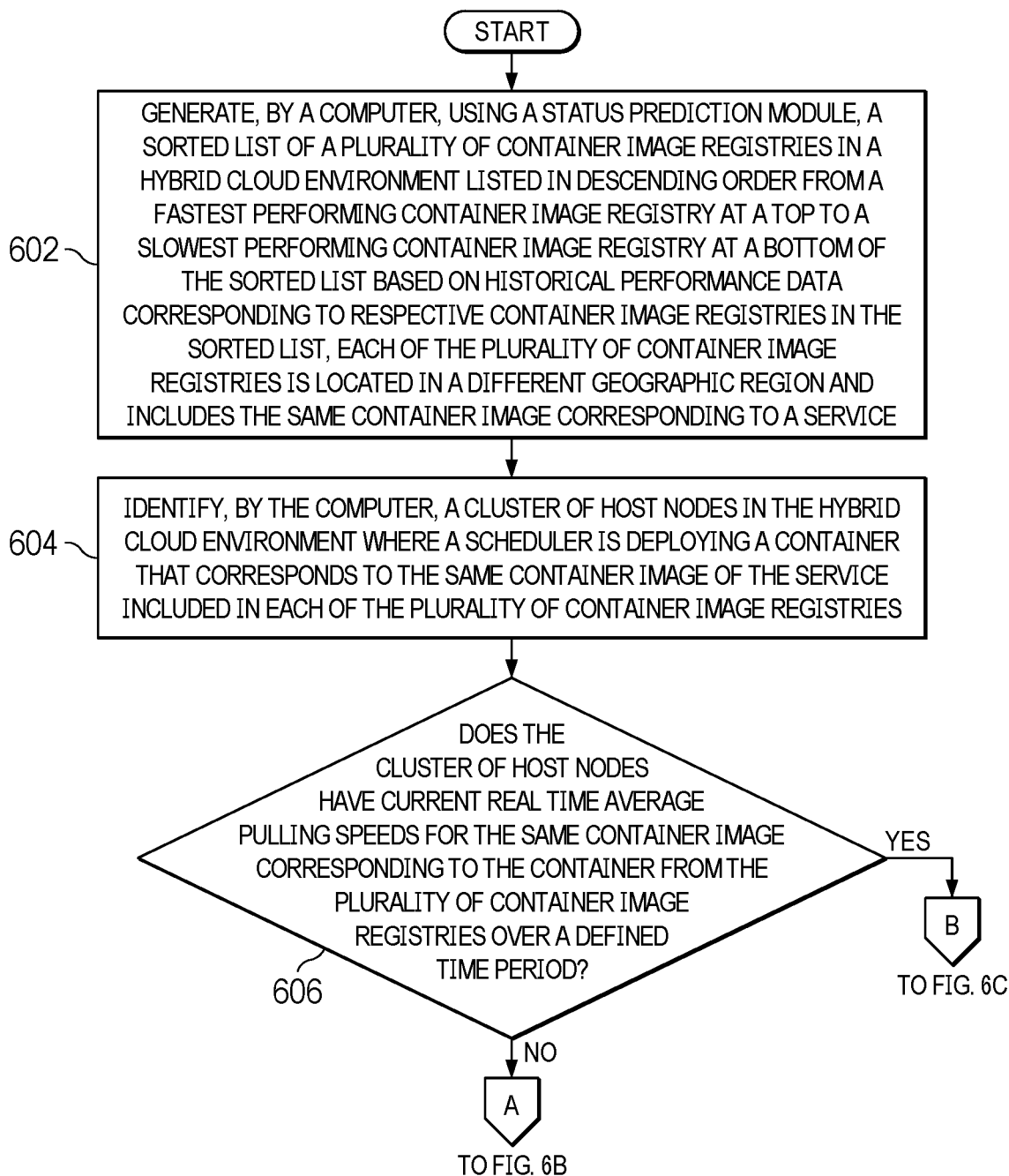
FIGS. 6A-6D are a flowchart illustrating a process for automatic container image registry selection in accordance with an illustrative embodiment.
Figure 6B:
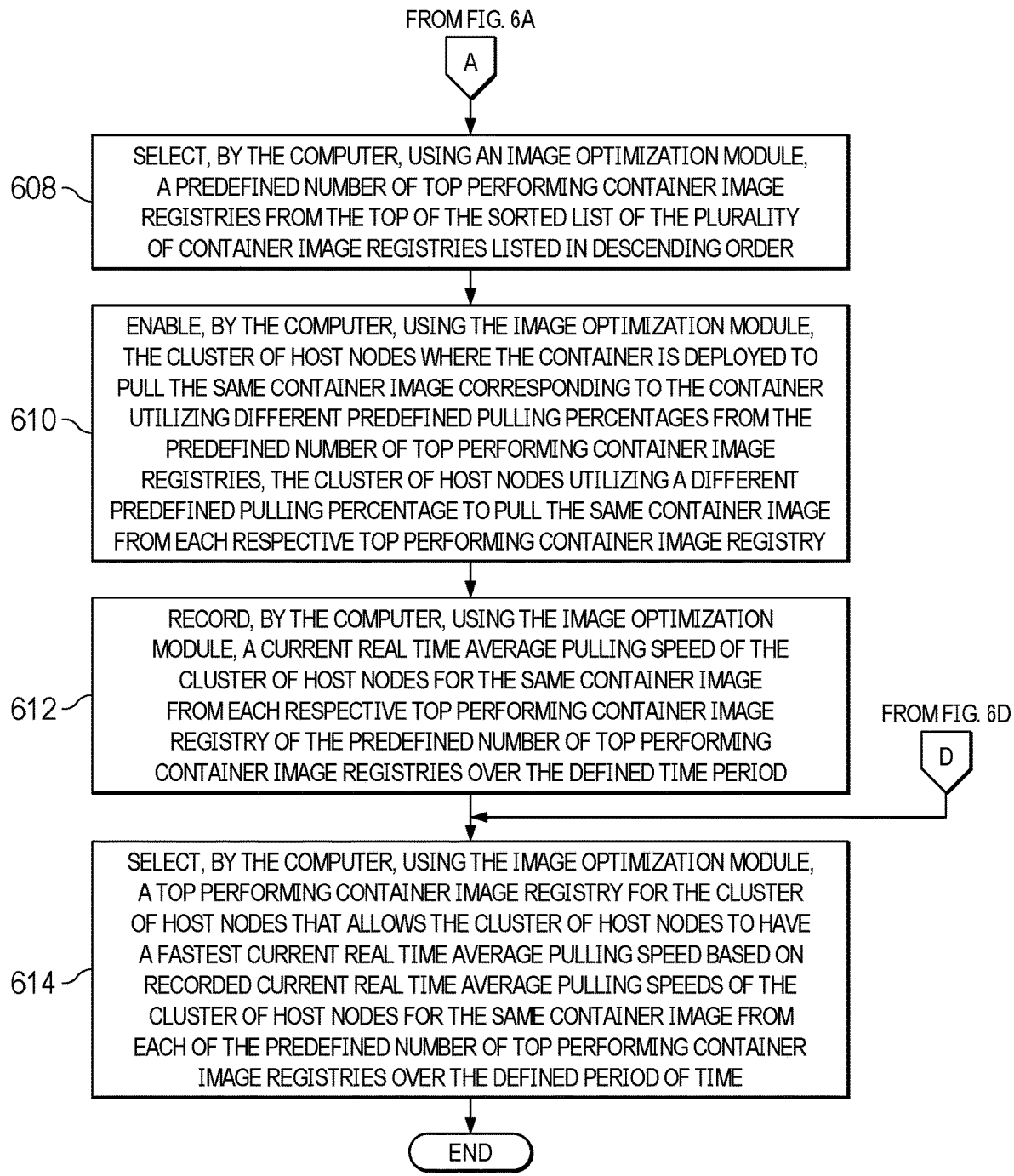
Figure 6C:
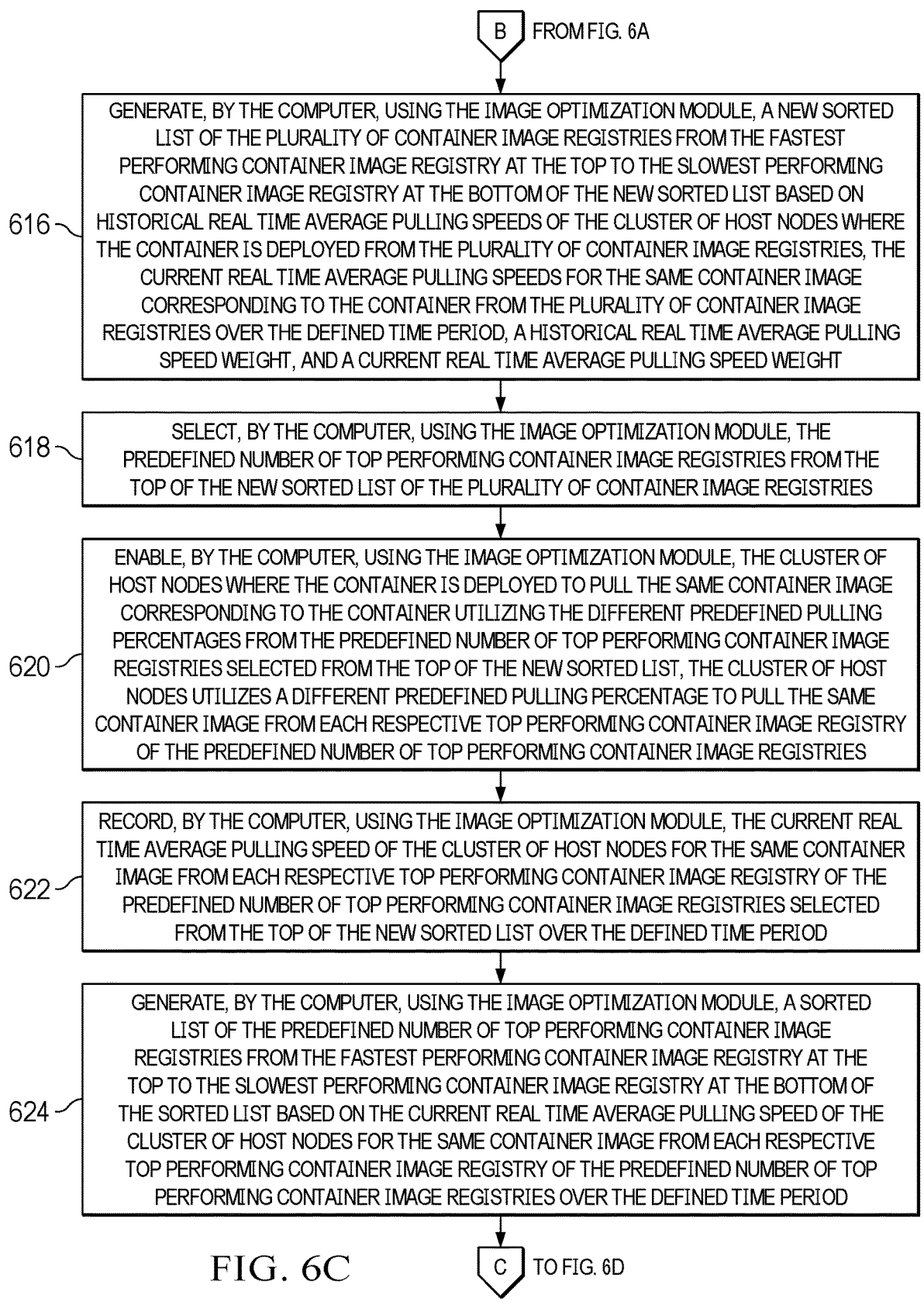
Figure 6D:
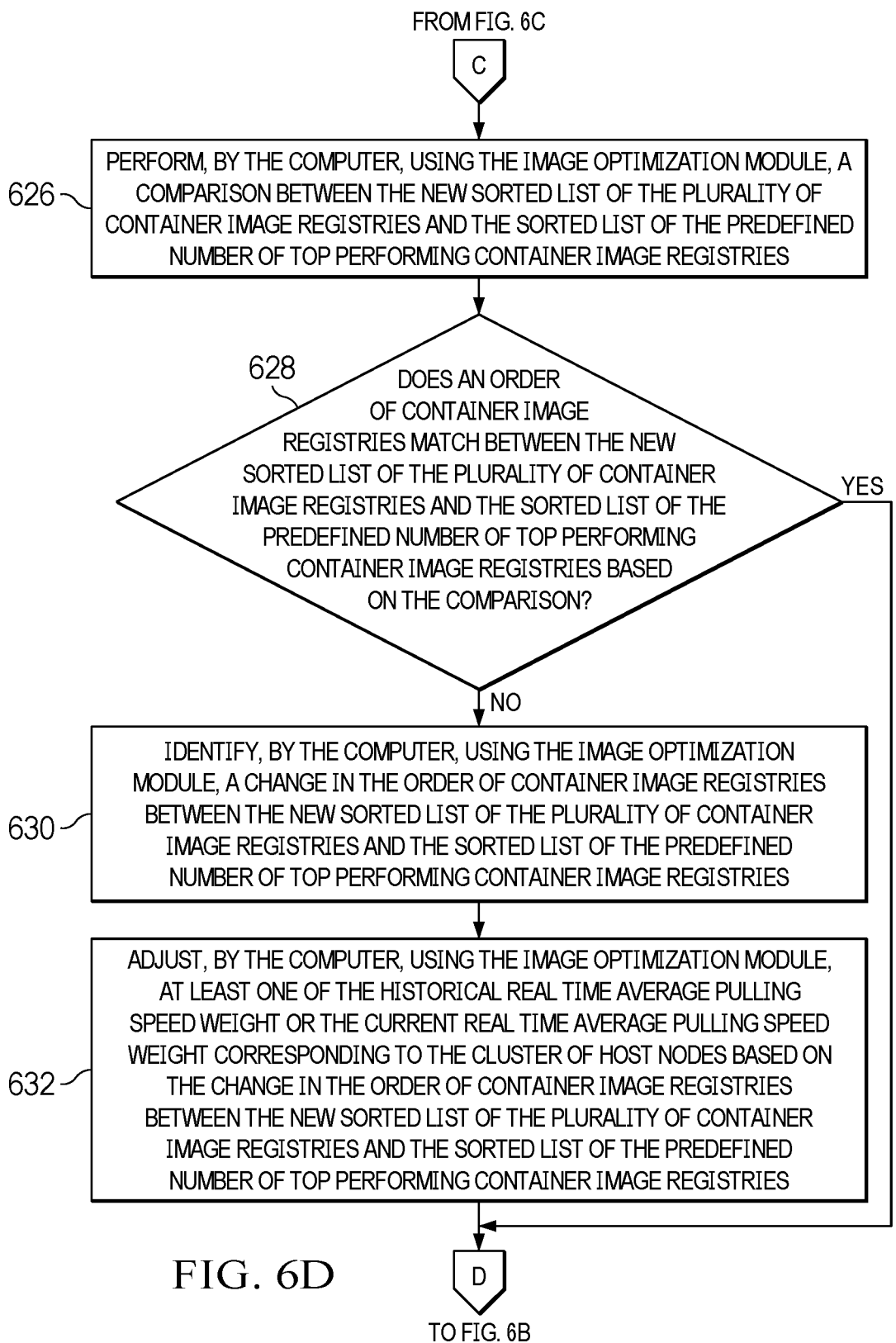

With reference now to FIGS. 5A-5B, a diagram illustrating an example of an image optimization module process is depicted in accordance with an illustrative embodiment.

Image optimization module process 500 is implemented by image optimization module 502, such as, for example, image optimization module 226 in FIG. 2.

In this example, image optimization module 502 is determining which of container image registry-1 504, container image registry-2 506, or container image registry-3 508 is the top or fastest performing container image registry for cluster of host nodes-A 510 to pull container image 512 for service-A from. Container image registry-1 504, container image registry-2 506, and container image registry-3 508 may be, for example, container image registry-1 412, container image registry-2 414, and container image registry-3 416 in FIG. 4. Container image 512 for service-A may be, for example, container image 410 for service-A in FIG. 4.

Image optimization module 502 receives sorted list 514 from a status prediction module, such as, for example, status prediction module 402 in FIG. 4. In this example, sorted list 514 is the same as sorted list 422 in FIG. 4 and is based on a historical performance data record, such as, for example, historical performance data record 420 in FIG. 4, that corresponds to cluster of host nodes-A 510.

Image optimization module process 500 includes scenario-1 516 and scenario-2 518. Scenario-1 516 is for when image optimization module 502 does not have any current real time average pulling speed data for cluster of host nodes-A 510 over the past defined period of time (e.g., past 30 minutes). Scenario-2 518 is for when image optimization module 502 does have current real time average pulling speed data for cluster of host nodes-A 510 over the past defined period of time.

In the example of scenario-1 516, image optimization module 502 selects the top 2 (i.e., predefined number) of container image registries (i.e., container image registry-2 506 and container image registry-3 508) from sorted list 514 in response to image optimization module 502 determining that cluster of host nodes-A 510 does not have any current real time average pulling speed data for over the past defined period of time. In addition, image optimization module 502 enables cluster of host nodes-A 510 to pull container image 512 for service-A only from container image registry-2 506 and container image registry-3 508 utilizing different predefined pulling percentages. The different predefined pulling percentages may be set by, for example, a program developer, system administrator, operations team, image optimization module 502 using a set of rules, or the like.

In this example, the predefined pulling percentages are set at 70% and 30%. Thus, cluster of host nodes-A 510 pulls container image 512 for service-A from container image registry-2 506, which is the fastest in sorted list 514, for 70% of the pods on host nodes where containers for service-A are deployed and pulls container image 512 for service-A from container image registry-3 508, which is the second fastest in sorted list 514, for 30% of the pods on host nodes where containers for service-A are deployed. However, it should be noted that these predefined pulling percentages are meant as examples only and not as limitations on illustrative embodiments. In other words, the predefined pulling percentages may be set at any percentage level.

Further, image optimization module 502 records the current real time average pulling speed of cluster of host nodes-A 510 from container image registry-2 506 and the current real time average pulling speed of cluster of host nodes-A 510 from container image registry-3 508. Then, image optimization module 502 automatically selects the container image registry having the fastest current real time average pulling speed for cluster of host nodes-A 510 to pull container image 512 for service-A from.

In the example of scenario-2 518, image optimization module 502 generates new sorted list 520 based on the historical real time average pulling speed and the current real time average pulling speed of cluster of host nodes-A 510 utilizing equation 522 in response to image optimization module 502 determining that cluster of host nodes-A 510 does have current real time average pulling speed data for the past defined period of time. Equation 522 is, for example:

$$D = \begin{cases} \infty, V_c = 0 \text{(inaccessible)} \\ \dfrac{\left(\dfrac{1}{V_h} * W_h + \dfrac{1}{V_c} * W_c\right)}{W_h + W_c}, V_c > 0 \text{(accessible)} \\ \dfrac{1}{V_h}, V_c < 0 \mid V_c \text{ is NULL(no real time data)} \end{cases}$$

where $V_c$ is the current real time average pulling speed of cluster of host nodes-A 510, $V_h$ is the historical real time average pulling speed of cluster of host nodes-A 510, $W_C$ is the weight value assigned to the current real time average pulling speed ($V_c$), and $W_h$ is the weight value assigned to the historical real time average pulling speed ($V_h$).

In the example of scenario-2 518, new sorted list 520 ranks container image registry-3 508 first as being the fastest performing container image registry, container image registry-1 504 second as being the second fastest performing container image registry, and container image registry-2 506 third as being the slowest performing container image registry. Image optimization module 502 selects the top 2 container image registries (i.e., container image registry-3 508 and container image registry-1 504) from new sorted list 520.

In addition, image optimization module 502 enables cluster of host nodes-A 510 to pull container image 512 for service-A only from container image registry-3 508 and container image registry-1 504 utilizing the different predefined pulling percentages. As a result, cluster of host nodes-A 510 pulls container image 512 for service-A from container image registry-3 508, which is the fastest in new sorted list 520, for 70% of the pods on host nodes where the containers for service-A are deployed and pulls container image 512 for service-A from container image registry-1 504, which is the second fastest in new sorted list 520, for 30% of the pods on host nodes where the containers for service-A are deployed.

Furthermore, image optimization module 502 records the current real time average pulling speed of cluster of host nodes-A 510 from container image registry-3 508 and the current real time average pulling speed of cluster of host nodes-A 510 from container image registry-1 504. Image optimization module 502 then orders container image registry-3 508 and container image registry-1 504 according to the recorded current real time average pulling speeds of cluster of host nodes-A 510 to form a sorted list of top or fastest performing container image registries. Moreover, at 524, image optimization module 502 iteratively compares new sorted list 520 with the sorted list of top performing container image registries to identify any changes in the order of the container image registries between the two lists. In response to image optimization module 502 identifying a change in the order of the container image registries in the two lists, image optimization module 502 adjusts at least one of the weight value ($W_c$) assigned to the current real time average pulling speed ($V_c$), the weight value ($W_h$) assigned to the historical real time average pulling speed ($V_h$), or both weight values. Afterward, image optimization module 502 automatically selects the container image registry having the fastest current real time average pulling speed for cluster of host nodes-A 510 to pull container image 512 for service-A from.

With reference now to FIGS. 6A-6D, a flowchart illustrating a process for automatic container image registry selection is shown in accordance with an illustrative embodiment. The process shown in FIGS. 6A-6D may be implemented in a computer, such as, for example, computer 101 in FIG. 1 or computer 214 in FIG. 2. For example, the process shown in FIGS. 6A-6D may be implemented in container image registry selection code 200 in FIG. 1.

The process begins when the computer, using a status prediction module, generates a sorted list of a plurality of container image registries in a hybrid cloud environment that are listed in descending order from a fastest performing container image registry at a top to a slowest performing container image registry at a bottom of the sorted list based on historical performance data corresponding to respective container image registries in the sorted list (step 602). Each of the plurality of container image registries is located in a different geographic region and includes the same container image corresponding to a service.

In addition, the computer identifies a cluster of host nodes in the hybrid cloud environment where a scheduler is deploying a container that corresponds to the same container image of the service included in each of the plurality of container image registries (step 604). The computer, using an image optimization module, makes a determination as to whether the cluster of host nodes has current real time average pulling speeds for the same container image corresponding to the container from the plurality of container image registries over a defined time period (step 606).

If the computer, using an image optimization module, determines that the cluster of host nodes does not have current real time average pulling speeds for the same container image corresponding to the container from the plurality of container image registries over the defined time period, no output of step 606, then the computer, using the image optimization module, selects a predefined number of top performing container image registries from the top of the sorted list of the plurality of container image registries listed in descending order (step 608). Further, the computer, using the image optimization module, enables the cluster of host nodes where the container is deployed to pull the same container image corresponding to the container utilizing different predefined pulling percentages from the predefined number of top performing container image registries (step 610). It should be noted that the predefined number of top performing container image registries is less than the total number of container image registries included in the sorted list of the plurality of container image registries in the hybrid cloud environment. The cluster of host nodes utilizes a different predefined pulling percentage to pull the same container image from each respective top performing container image registry.

Furthermore, the computer, using the image optimization module, records a current real time average pulling speed of the cluster of host nodes for the same container image from each respective top performing container image registry of the predefined number of top performing container image registries over the defined time period (step 612). Moreover, the computer, using the image optimization module, selects a top performing container image registry for the cluster of host nodes that allows the cluster of host nodes to have a fastest current real time average pulling speed based on recorded current real time average pulling speeds of the cluster of host nodes for the same container image from each of the predefined number of top performing container image registries over the defined period of time (step 614). Thereafter, the process terminates.

Returning again to step 606, if the computer, using an image optimization module, determines that the cluster of host nodes does have current real time average pulling speeds for the same container image corresponding to the container from the plurality of container image registries over the defined time period, yes output of step 606, then the computer, using the image optimization module, generates a new sorted list of the plurality of container image registries from the fastest performing container image registry at the top to the slowest performing container image registry at the bottom of the new sorted list based on historical real time average pulling speeds of the cluster of host nodes where the container is deployed from the plurality of container image registries, the current real time average pulling speeds for the same container image corresponding to the container from the plurality of container image registries over the defined time period, a historical real time average pulling speed weight, and a current real time average pulling speed weight (step 616). The computer, using the image optimization module, selects the predefined number of top performing container image registries from the top of the new sorted list of the plurality of container image registries (step 618).

The computer, using the image optimization module, enables the cluster of host nodes where the container is deployed to pull the same container image corresponding to the container utilizing the different predefined pulling percentages from the predefined number of top performing container image registries selected from the top of the new sorted list of the plurality of container image registries (step 620). The cluster of host nodes utilizes a different predefined pulling percentage to pull the same container image from each respective top performing container image registry of the predefined number of top performing container image registries.

The computer, using the image optimization module, records the current real time average pulling speed of the cluster of host nodes for the same container image from each respective top performing container image registry of the predefined number of top performing container image registries selected from the top of the new sorted list of the plurality of container image registries over the defined time period (step 622). In addition, the computer, using the image optimization module, generates a sorted list of the predefined number of top performing container image registries from the fastest performing container image registry at the top to the slowest performing container image registry at the bottom of the sorted list based on the current real time average pulling speed of the cluster of host nodes for the same container image from each respective top performing container image registry of the predefined number of top performing container image registries over the defined time period (step 624).

Afterward, the computer, using the image optimization module, performs a comparison between the new sorted list of the plurality of container image registries and the sorted list of the predefined number of top performing container image registries (step 626). The computer, using the image optimization module, makes a determination as to whether an order of container image registries matches between the new sorted list of the plurality of container image registries and the sorted list of the predefined number of top performing container image registries based on the comparison (step 628).

If the computer, using the image optimization module, determines that the order of container image registries does match between the new sorted list of the plurality of container image registries and the sorted list of the predefined number of top performing container image registries based on the comparison, yes output of step 628, then the process returns to step 614 where the computer, using the image optimization module, selects the top performing container image registry for the cluster of host nodes. If the computer, using the image optimization module, determines that the order of container image registries does not match between the new sorted list of the plurality of container image registries and the sorted list of the predefined number of top performing container image registries based on the comparison, no output of step 628, then the computer, using the image optimization module, identifies a change in the order of container image registries between the new sorted list of the plurality of container image registries and the sorted list of the predefined number of top performing container image registries (step 630). The computer, using the image optimization module, also adjusts at least one of the historical real time average pulling speed weight or the current real time average pulling speed weight corresponding to the cluster of host nodes based on the change in the order of container image registries between the new sorted list of the plurality of container image registries and the sorted list of the predefined number of top performing container image registries (step 632). Thereafter, the process returns to step 614 where the computer, using the image optimization module, selects the top performing container image registry for the cluster of host nodes.

Thus, illustrative embodiments of the present disclosure provide a computer-implemented method, computer system, and computer program product for automatically selecting a top performing container image registry for a cluster of host nodes. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic container image registry selection, the computer-implemented method comprising:
   selecting, by a computer, a predefined number of top performing container image registries from a top of a sorted list of a plurality of container image registries listed in descending order;
   enabling, by the computer, a cluster of host nodes where a container is deployed to pull a same container image corresponding to the container utilizing different predefined pulling percentages from the predefined number of top performing container image registries, the cluster of host nodes utilizes a different predefined pulling percentage to pull the same container image from each respective top performing container image registry; and
   recording, by the computer, a current real time average pulling speed of the cluster of host nodes for the same container image from each respective top performing container image registry of the predefined number of top performing container image registries over a defined time period.

2. The computer-implemented method of claim 1, further comprising:
   selecting, by the computer, a top performing container image registry for the cluster of host nodes that allows the cluster of host nodes to have a fastest current real time average pulling speed based on recorded current real time average pulling speeds of the cluster of host nodes for the same container image from each of the predefined number of top performing container image registries over the defined time period.

3. The computer-implemented method of claim 1, further comprising:
   generating, by the computer, the sorted list of the plurality of container image registries that are listed in descending order from a fastest performing container image registry at a top to a slowest performing container image registry at a bottom of the sorted list based on historical performance data corresponding to respective container image registries in the sorted list;
   identifying, by the computer, the cluster of host nodes where a scheduler is deploying the container that corresponds to the same container image included in each of the plurality of container image registries;
   determining, by the computer, whether the cluster of host nodes has current real time average pulling speeds for the same container image corresponding to the container from the plurality of container image registries over the defined time period; and
   selecting, by the computer, the predefined number of top performing container image registries from the top of the sorted list of the plurality of container image registries in response to the computer determining that the cluster of host nodes does not have current real time average pulling speeds for the same container image corresponding to the container from the plurality of container image registries over the defined time period.

4. The computer-implemented method of claim 3, further comprising:
   generating, by the computer, a new sorted list of the plurality of container image registries from a fastest performing container image registry at the top to the slowest performing container image registry at the bottom of the new sorted list based on historical real time average pulling speeds of the cluster of host nodes where the container is deployed from the plurality of container image registries, the current real time average pulling speeds for the same container image corresponding to the container from the plurality of container image registries over the defined time period, a historical real time average pulling speed weight, and a current real time average pulling speed weight in response to the computer determining that the cluster of host nodes does have the current real time average pulling speeds for the same container image corresponding to the container from the plurality of container image registries over the defined time period.

5. The computer-implemented method of claim 4, further comprising:

selecting, by the computer, the predefined number of top performing container image registries from the top of the new sorted list of the plurality of container image registries;

enabling, by the computer, the cluster of host nodes where the container is deployed to pull the same container image corresponding to the container utilizing the different predefined pulling percentages from the predefined number of top performing container image registries selected from the top of the new sorted list; and recording, by the computer, the current real time average pulling speed of the cluster of host nodes for the same container image from each respective top performing container image registry of the predefined number of top performing container image registries selected from the top of the new sorted list over the defined time period.

6. The computer-implemented method of claim 5, further comprising:

generating, by the computer, a sorted list of the predefined number of top performing container image registries from the fastest performing container image registry at the top to the slowest performing container image registry at the bottom of the sorted list based on the current real time average pulling speed of the cluster of host nodes for the same container image from each respective top performing container image registry of the predefined number of top performing container image registries over the defined time period; and performing, by the computer, a comparison between the new sorted list of the plurality of container image registries and the sorted list of the predefined number of top performing container image registries.

7. The computer-implemented method of claim 6, further comprising:

determining, by the computer, whether an order of container image registries matches between the new sorted list of the plurality of container image registries and the sorted list of the predefined number of top performing container image registries based on the comparison;

identifying, by the computer, a change in the order of container image registries between the new sorted list of the plurality of container image registries and the sorted list of the predefined number of top performing container image registries in response to the computer determining that the order of container image registries does not match between the new sorted list of the plurality of container image registries and the sorted list of the predefined number of top performing container image registries based on the comparison; and adjusting, by the computer, at least one of the historical real time average pulling speed weight or the current real time average pulling speed weight corresponding to the cluster of host nodes based on the change in the order of container image registries between the new sorted list of the plurality of container image registries and the sorted list of the predefined number of top performing container image registries.

8. A computer system for automatic container image registry selection, the computer system comprising:

a communication fabric;

a storage device connected to the communication fabric, wherein the storage device stores program instructions; and a processor connected to the communication fabric, wherein the processor executes the program instructions to:

select a predefined number of top performing container image registries from a top of a sorted list of a plurality of container image registries listed in descending order;

enable a cluster of host nodes where a container is deployed to pull a same container image corresponding to the container utilizing different predefined pulling percentages from the predefined number of top performing container image registries, the cluster of host nodes utilizes a different predefined pulling percentage to pull the same container image from each respective top performing container image registry; and record a current real time average pulling speed of the cluster of host nodes for the same container image from each respective top performing container image registry of the predefined number of top performing container image registries over a defined time period.

9. The computer system of claim 8, wherein the processor further executes the program instructions to:

select a top performing container image registry for the cluster of host nodes that allows the cluster of host nodes to have a fastest current real time average pulling speed based on recorded current real time average pulling speeds of the cluster of host nodes for the same container image from each of the predefined number of top performing container image registries over the defined time period.

10. The computer system of claim 8, wherein the processor further executes the program instructions to:

generate the sorted list of the plurality of container image registries that are listed in descending order from a fastest performing container image registry at a top to a slowest performing container image registry at a bottom of the sorted list based on historical performance data corresponding to respective container image registries in the sorted list;

identify the cluster of host nodes where a scheduler is deploying the container that corresponds to the same container image included in each of the plurality of container image registries;

determine whether the cluster of host nodes has current real time average pulling speeds for the same container image corresponding to the container from the plurality of container image registries over the defined time period; and select the predefined number of top performing container image registries from the top of the sorted list of the plurality of container image registries in response to determining that the cluster of host nodes does not have current real time average pulling speeds for the same container image corresponding to the container from the plurality of container image registries over the defined time period.

11. The computer system of claim 10, wherein the processor further executes the program instructions to:

generate a new sorted list of the plurality of container image registries from a fastest performing container image registry at the top to the slowest performing container image registry at the bottom of the new sorted list based on historical real time average pulling speeds of the cluster of host nodes where the container is deployed from the plurality of container image registries, the current real time average pulling speeds for the same container image corresponding to the container from the plurality of container image registries over the defined time period, a historical real time average pulling speed weight, and a current real time average pulling speed weight in response to determining that the cluster of host nodes does have the current real time average pulling speeds for the same container image corresponding to the container from the plurality of container image registries over the defined time period.

12. The computer system of claim 11, wherein the processor further executes the program instructions to:
select the predefined number of top performing container image registries from the top of the new sorted list of the plurality of container image registries;
enable the cluster of host nodes where the container is deployed to pull the same container image corresponding to the container utilizing the different predefined pulling percentages from the predefined number of top performing container image registries selected from the top of the new sorted list; and
record the current real time average pulling speed of the cluster of host nodes for the same container image from each respective top performing container image registry of the predefined number of top performing container image registries selected from the top of the new sorted list over the defined time period.

13. The computer system of claim 12, wherein the processor further executes the program instructions to:
generate a sorted list of the predefined number of top performing container image registries from the fastest performing container image registry at the top to the slowest performing container image registry at the bottom of the sorted list based on the current real time average pulling speed of the cluster of host nodes for the same container image from each respective top performing container image registry of the predefined number of top performing container image registries over the defined time period; and
perform a comparison between the new sorted list of the plurality of container image registries and the sorted list of the predefined number of top performing container image registries.

14. A computer program product for automatic container image registry selection, the computer program product comprising a computer readable storage medium having program instructions embodied therewith, the program instructions executable by a computer to cause the computer to:
select a predefined number of top performing container image registries from a top of a sorted list of a plurality of container image registries listed in descending order;
enable a cluster of host nodes where a container is deployed to pull a same container image corresponding to the container utilizing different predefined pulling percentages from the predefined number of top performing container image registries, the cluster of host nodes utilizes a different predefined pulling percentage to pull the same container image from each respective top performing container image registry; and
record a current real time average pulling speed of the cluster of host nodes for the same container image from each respective top performing container image registry of the predefined number of top performing container image registries over a defined time period.

15. The computer program product of claim 14, wherein the program instructions further cause the computer to:
select a top performing container image registry for the cluster of host nodes that allows the cluster of host nodes to have a fastest current real time average pulling speed based on recorded current real time average pulling speeds of the cluster of host nodes for the same container image from each of the predefined number of top performing container image registries over the defined time period.

16. The computer program product of claim 14, wherein the program instructions further cause the computer to:
generate the sorted list of the plurality of container image registries that are listed in descending order from a fastest performing container image registry at a top to a slowest performing container image registry at a bottom of the sorted list based on historical performance data corresponding to respective container image registries in the sorted list;
identify the cluster of host nodes where a scheduler is deploying the container that corresponds to the same container image included in each of the plurality of container image registries;
determine whether the cluster of host nodes has current real time average pulling speeds for the same container image corresponding to the container from the plurality of container image registries over the defined time period; and
select the predefined number of top performing container image registries from the top of the sorted list of the plurality of container image registries in response to determining that the cluster of host nodes does not have current real time average pulling speeds for the same container image corresponding to the container from the plurality of container image registries over the defined time period.

17. The computer program product of claim 16, wherein the program instructions further cause the computer to:
generate a new sorted list of the plurality of container image registries from a fastest performing container image registry at the top to the slowest performing container image registry at the bottom of the new sorted list based on historical real time average pulling speeds of the cluster of host nodes where the container is deployed from the plurality of container image registries, the current real time average pulling speeds for the same container image corresponding to the container from the plurality of container image registries over the defined time period, a historical real time average pulling speed weight, and a current real time average pulling speed weight in response to determining that the cluster of host nodes does have the current real time average pulling speeds for the same container image corresponding to the container from the plurality of container image registries over the defined time period.

18. The computer program product of claim 17, wherein the program instructions further cause the computer to:
select the predefined number of top performing container image registries from the top of the new sorted list of the plurality of container image registries;
enable the cluster of host nodes where the container is deployed to pull the same container image corresponding to the container utilizing the different predefined pulling percentages from the predefined number of top performing container image registries selected from the top of the new sorted list; and
record the current real time average pulling speed of the cluster of host nodes for the same container image from each respective top performing container image registry of the predefined number of top performing container image registries selected from the top of the new sorted list over the defined time period.

19. The computer program product of claim 18, wherein the program instructions further cause the computer to:
generate a sorted list of the predefined number of top performing container image registries from the fastest performing container image registry at the top to the slowest performing container image registry at the bottom of the sorted list based on the current real time average pulling speed of the cluster of host nodes for the same container image from each respective top performing container image registry of the predefined number of top performing container image registries over the defined time period; and
perform a comparison between the new sorted list of the plurality of container image registries and the sorted list of the predefined number of top performing container image registries.

20. The computer program product of claim 19, wherein the program instructions further cause the computer to:
determine whether an order of container image registries matches between the new sorted list of the plurality of container image registries and the sorted list of the predefined number of top performing container image registries based on the comparison;
identify a change in the order of container image registries between the new sorted list of the plurality of container image registries and the sorted list of the predefined number of top performing container image registries in response to determining that the order of container image registries does not match between the new sorted list of the plurality of container image registries and the sorted list of the predefined number of top performing container image registries based on the comparison; and
adjust at least one of the historical real time average pulling speed weight or the current real time average pulling speed weight corresponding to the cluster of host nodes based on the change in the order of container image registries between the new sorted list of the plurality of container image registries and the sorted list of the predefined number of top performing container image registries.

* * * * *